United States Patent Office 3,490,543
Patented Jan. 20, 1970

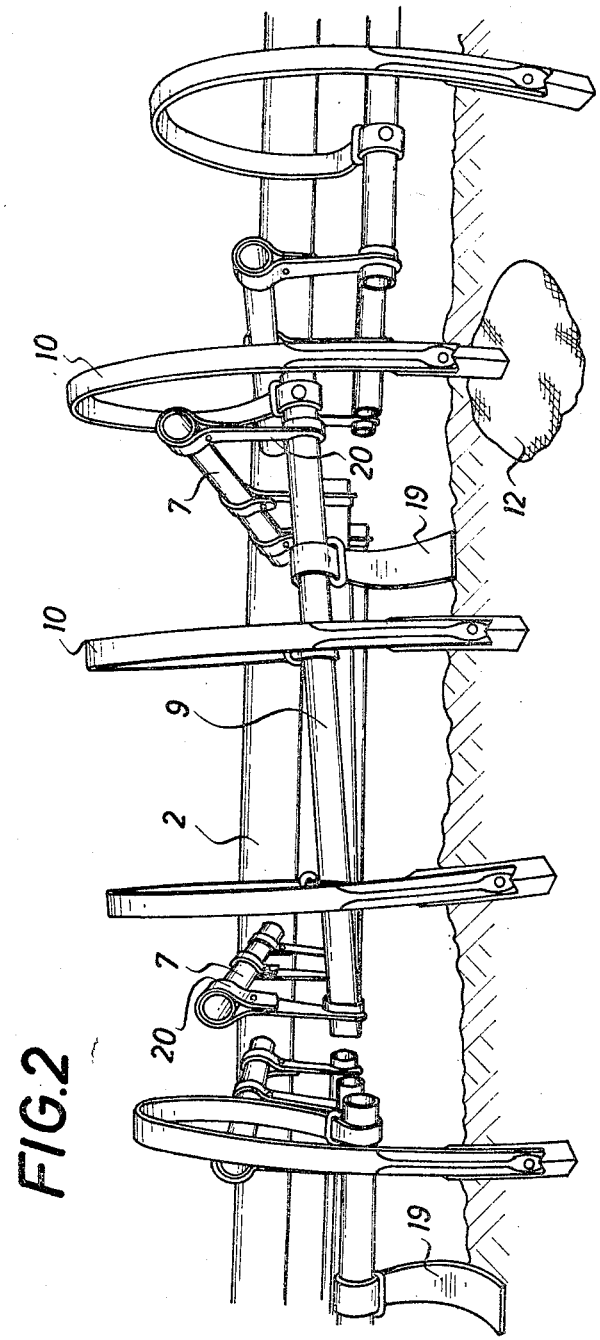

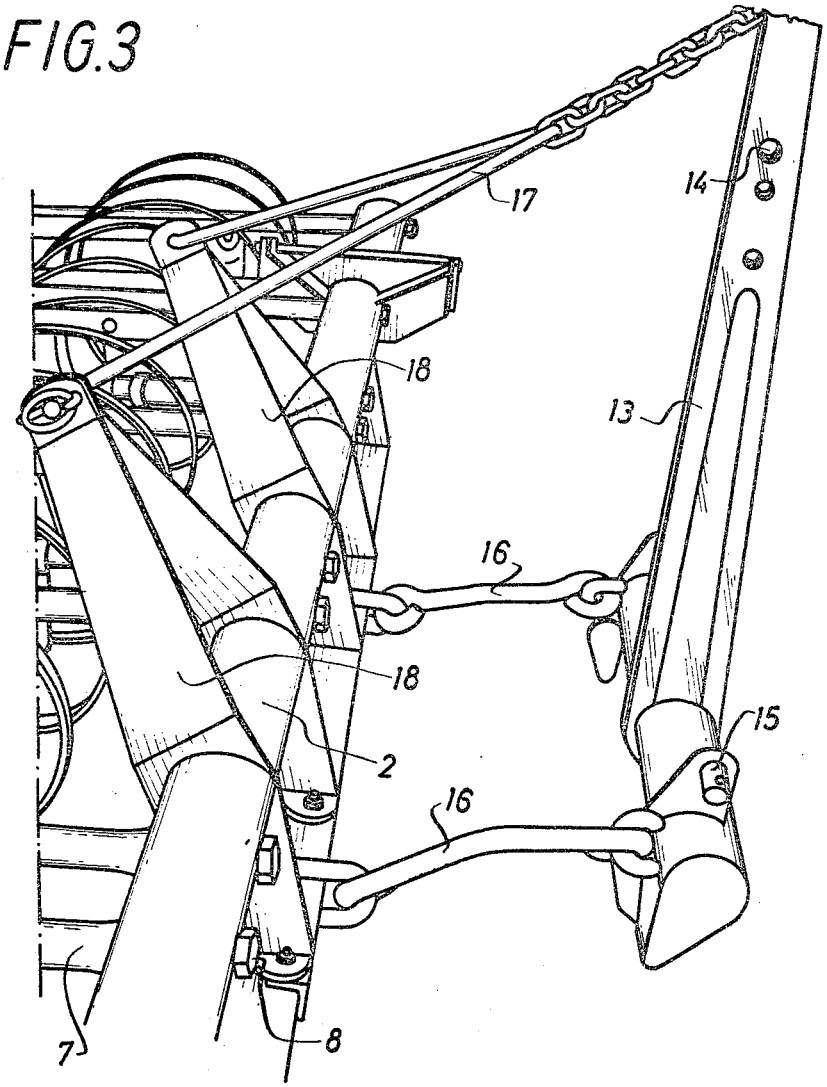

3,490,543
AGRICULTURAL IMPLEMENT
Olav Njå, Kvernaland, Norway, assignor to Kvernalands Fabrikk A/S, Kvernaland, Norway
Filed June 6, 1966, Ser. No. 555,569
Claims priority, application Norway, June 16, 1965, 158,523
Int. Cl. A01b *19/04, 23/04, 59/04*
U.S. Cl. 172—643                                    3 Claims

ABSTRACT OF THE DISCLOSURE

An agricultural implement of the type drawn by a tractor in which cultivating elements are connected to a rigid support by means of flexible and resilient means, to enable the elements to recoil from obstructions encountered and in which there is a minimum of rotating parts and hence a minimum of wear. The outermost sections of the rigid support being hinged to permit upward and inward folding of said portions for transportation purposes when the entire implement is raised from the ground.

---

Generally speaking, the present invention concerns agricultural impelements of the tractor drawn type and which are adapted to be raised from the ground for transport purposes.

Various constructions of this type of harrow have been developed during the course of time. These known constructions are not adequate enough, however, to satisfy the present day demand for rationalization. The modern harrow must be of the maximum size and weight the tractor is capable of pulling, and the teeth of the harrow are thus subjected to unreasonably great strain and impact stress on striking against obstructions in the soil.

The size of modern agricultural implements is constantly increasing, and if generally known principles are followed, that is to say merely to increase the dimensions of e.g. a spring harrow, it becomes in consequence more and more difficult to provide means which permit the teeth of the harrow to recoil.

The object of the present invention is to provide a novel construction of an agricultural implement, and of a spring harrow in particular, of such light weight that a large spring harrow may be supported by a light tractor. An equally important feature, however, is that the harrow teeth are capable of recoiling in a satisfactory manner from obstructions in the soil without disturbing or interrupting the operation of adjacent harrow teeth by reason of this flexibility.

In accordance with the invention, the teeth of the harrow are protected in such a manner that the expense of spare parts to the user of the harrow is greatly reduced.

This is achieved in accordance with the invention in that not only the harrow teeth but also large sections of the harrow structure are adapted to recoil when the harrow teeth strike against obstructions. By reason of this resilient flexibility the harrow teeth return to the correct operating depth immediately after passing over the obstruction.

According to the present invention this flexibility is provided in that the harrow teeth are mounted on tooth poles which are attached to freely projecting frame portions in the form of resilient flexible substantially parallel tubes or rods which are mounted at their inner ends on a transverse support. The said support is connected to the drawing and lifting members of the tractor. The outer ends of the flexible resilient frame portions are free to conform to the surface of the ground and to recoil when necessary. The tooth poles, arranged between pairs of frame portions, are adjustable in the longitudinal direction of said frame portions, such adjustment being necessary in order to avoid trailing weeds and similar trash.

The said support wherein are mounted the rearwardly directed frame portions is preferably tube shaped and is preferably rigidly connected with members mounted on the lifting member of the tractor, so that the entire harrow may be raised merely by raising the support, which is not itself pivotable in relation to the lifting means.

The invention thus concerns agricultural implements, particularly spring harrows, comprising a rigid support mounted transversely of the direction of movement of the harrow, said support being adapted to be connected to the tractor and forming a mounting for frame portions which carry the harrow teeth, and the invention is substantially distinguished in that the frame portions are in the form of resilient tubes or rods which at the forward or inner end are rigidly connected to the common support, and, at the other outer end, project freely from said support.

According to another feature the outermost portions of the rigid support are pivoted so as to permit upward and inward folding thereof for transport.

Other features and details of the present invention will be made clear by the following description with reference to the drawings where:

FIG. 2 shows a portion of the harrow in operation in the soil and

FIG. 3 shows a detail of the suspension of the harrow on the tractor.

Figure 1:
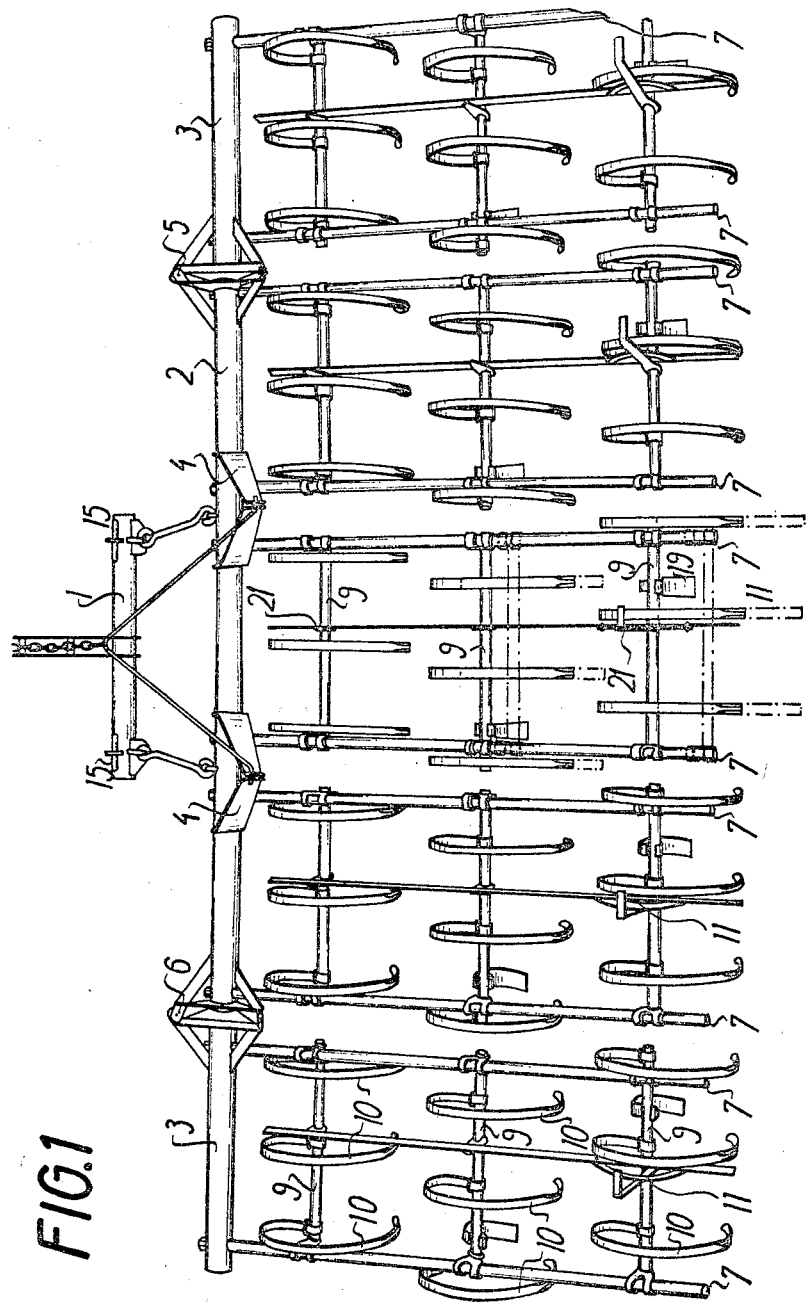
FIG. 1 shows a harrow seen in perspective, at an angle from above.

It should be pointed out that the spring harrow is chosen as an example here and that the invention as such may be used equally well with other types of implements.

The spring harrow comprises, as shown in FIG. 1, an implement frame 1 which is connected to a support 2, 3 by means of suspension members 4 which are further described with reference to FIG. 3.

The outer portions 3 of the support are pivotable at pivot link 5, 6 so that the portions 3 may be pivoted in over the centre portion 2 when the harrow is in transport position. Frame portions 7 in the form of parallel resilient tubes or rods are attached to the support 2, 3 said tubes or rods being in the same plane. In FIG. 3 it may be seen that the frame portions 7 are mounted in the support 2 by means of a screw connection 8. The harrow teeth 10 are attached to tooth poles 9 which are mounted on the frame portions. The harrow teeth may be adjusted in depth in a manner known per se by means of a mechanism which is generally signified at 11 for rotating the harrows 10 about the axes of the poles 9.

The frame members 7 are of flexible resilient material so that they may recoil, as shown in FIG. 2, when a tooth strikes against a stone 12 or other obstruction. The plane in which the tooth poles 9 lie will then be twisted as shown in FIG. 2 and the teeth 10 will be released in such a way that the twisting of one set of teeth 10 between two frame portions 7 will have no substantial effect on the operation of the teeth on either side. In addition to the fact that the flexibility is thus exremely advantageous with regard to the release of the teeth from unreasonable stress, the construction is simple and reliable, and he harrow may be raised to transport position by a simple lifting of the support 2, 3, e.g. as suggested in FIG. 3, where only the support 2 has direct connection with the suspension of the tractor. The implement is here provided in known manner with an implement frame 13 which at 14 and 15 is adapted to be connected to the three point suspension of the tractor. The connection between the frame 13 and the harrow is further formed by links 16 which allow free pivotal movement of the harrow in relation to the tractor when this is in operating position, and a link 17, which extends from the upper end of the implement frame 13 to two upwardly directioned arms 18 which are welded on the support 2 so that said support is unable to twist. Thus, when the implement frame 13 is raised by the hydraulic lifting means on the tractor, the links 16 will pivot downwards so that the harrow is brought up against the tractor and raised at the same time, while the upper link 17 prevents the harrow from tipping downwardly at the rear.

The harrow is maintained at correct working height in a manner known per se by means of drag shoes 19.

As may be seen in FIG. 2, the tooth poles 9 are, moreover, adjustably mounted on two frame portions 7 by means of releasable clamps 20, and this permits adjustment of the tooth poles 9 forwardly and backwardly as suggested in the central portions of FIG. 1 by solid and dotted lines respectively. This adjustment is of great advantage e.g. in order to avoid the trailing of weeds. The adjustment means 11 for the operational depth of the teeth must then be adjusted accordingly, and at points 21 (FIG. 1) there are connections between the adjustment mechanism 11 and the other tooth poles 9 connected to the same pair of frame portions 7.

In addition to the above mentioned advantages which relieve the teeth of the harrow from unreasonable stresses, the present invention provides a lightweight but strong harrow, or other agricultural implement, having very few movable hinge joints and connections which might become worn out, since the recipirocal movements necessary are achieved by flexible resilient members.

The shown example serves merely to illustrate the invention and forms no limit for this since other embodiments of the invention are possible, for instance the suspension means with the non-pivotable support may well be used with agricultural implements other than spring harrows.

I claim:

1. An agricultural implement of the type drawn by a tractor comprising a rigid support located transversely of the direction of travel of the tractor and to the rear thereof, means connecting said support to the tractor and for raising and lowering said implement, frame portions securely fixed to said support, said frame portions being resiliently flexible and elongated so as to extend outwardly and rearwardly of said support in substantially parallel arrangement, said frame portions being arranged in pairs, means mounted rotatably on and extending between each pair of frame portions, cultivating means supported on said rotatable means whereby the resilient frame portions and rotatable means will permit said cultivating means to recoil from obstructions encountered.

2. An agricultural implement as claimed in claim 1 wherein said rotatable means are displaceable along the axes of said resilient frame portions.

3. An agricultural implement as claimed in claim 1 and further comprising a pair of hinge members spaced from the two outer ends of said rigid support to form outer sections thereof whereby the outer sections of said support and the frame portions securely fixed thereto may be raised upwardly and inwardly to fold said section over the center section of said support for transportation and means for raising and lower said rigid support with relation to the ground.

References Cited

UNITED STATES PATENTS

| 3,033,296 | 5/1962 | Kaufman et al. | 172—629 |
| 2,341,807 | 2/1944 | Olmstead et al. | 172—439 X |
| 2,645,989 | 7/1953 | Prince | 172—451 X |
| 2,791,340 | 5/1957 | Haines et al. | 172—274 X |
| 3,154,151 | 10/1964 | Zimmer et al. | 172—456 |
| 3,318,389 | 5/1967 | Kirchner | 172—449 X |

ROBERT E. PULFREY, Primary Examiner

RONALD C. HARRINGTON, Assistant Examiner

U.S. Cl. X.R.

172—449, 706